Dec. 30, 1969 B. TOPAS 3,487,273

HIGH TEMPERATURE CONTROLLED RECTIFIER

Filed March 4, 1968

INVENTOR.
BENJAMIN TOPAS

BY

OSTROLENK, FABER, GERB & SOFFEN

ATTORNEYS

United States Patent Office 3,487,273
Patented Dec. 30, 1969

3,487,273

HIGH TEMPERATURE CONTROLLED RECTIFIER

Benjamin Topas, Santa Monica, Calif., assignor to International Rectifier Corporation, Los Angeles, Calif.

Filed Mar. 4, 1968, Ser. No. 709,985
Int. Cl. H01l 3/00, 5/00, 11/00
U.S. Cl. 317—234 7 Claims

ABSTRACT OF THE DISCLOSURE

A controlled rectifier having good forward rate-of-rise-of-forward-voltage withstandability, fast turn-off time, low reverse leakage current and low forward voltage drop at temperatures up to 175° C. The emitter layer is formed of an epitaxially deposited layer which forms a junction with its substrate, and is spaced by about 2.2 mils from the next lower and diffused junction.

This invention is an improvement of the controlled rectifier structure shown in U.S. Patent 3,278,347 (IR-345), entitled, "High Voltage Semiconductor Device," in the name of Benjamin Topas, and assigned to the assignee of the present invention.

This invention relates to controlled rectifiers, and more particularly relates to a controlled rectifier which is operable at temperatures up to about 175° C.

As the operating temperature of controlled rectifiers increases, its reverse leakage current increases; its ability to block rapidly rising forward voltages decreases, and its turn-off time increases. For these reasons, controlled rectifiers could not heretofore be used at temperatures over 125° C. without being considerably derated.

Moreover, in circuits using both controlled rectifiers and diodes, separate heat sinks must be used since the diodes can operate at about 200° C., while the controlled rectifiers must be held to 125° C. or under, depending on how they are derated.

The present invention provides a controlled rectifier capable of operation at temperatures up to about 175° C., permitting the use of the devices in higher temperature environments; and permitting the connection of the devices to the same heat sinks as diodes and other high temperature capability devices.

Accordingly, a primary object of this invention is to provide a controlled rectifier which can operate at temperatures of about 175° C.

Another object of this invention is to provide a novel controlled rectifier configuration which can withstand high rate-of-rise-of-forward-voltage; has a fast turn-off time and low leakage current at temperatures in excess of 125° C., and will not spontaneously go into forward conduction as a result of high forward leakage current at temperatures in excess of 125° C.

A further object of this invention is to provide a novel controlled rectifier construction which can be used at high temperature without derating.

These and other objects of this invention will become apparent from the following description when taken in connection with the drawings in which.

Figure 1:
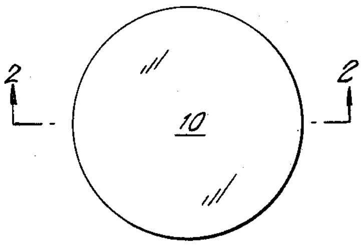
FIGURE 1 is a top plan view of a wafer of monocrystalline silicon material which is formed into the device of the invention.
Figure 2:
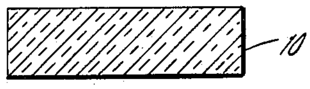
FIGURE 2 is a cross-sectional view of FIGURE 1 taken across the section line 2—2 in FIGURE 1.

Referring first to FIGURES 1 and 2, there is shown a wafer 10 of monocrystalline silicon which is of the N-type conductivity and has a resistivity of about 18 ohm-centimeters. Wafer 10 has a diameter of 0.7 inch for the formation of a device having a forward current rating of 70 amperes. For higher current devices, this diameter will be increased, for example, to 1.18 inches for a 300-ampere device. The thickness of wafer 10 after it has been cleaned and prepared for diffusion is 13 mils.

Figure 3:
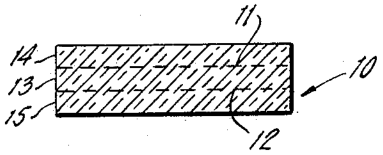
FIGURE 3 shows the formation of two diffused junctions in the wafer of FIGURE 2.

The wafer 10 (in practice, a large group of such wafers) is then placed in a conventional diffusion furnace and a conventional gallium diffusion cycle is carried out at a temperature of about 1250° C. for about 90 hours. This diffusion cycle, or the equivalent thereof, is to form the two junctions 11 and 12, shown in FIGURE 3 between the outer initial N-region 13 and the gallium diffused P-regions 14 and 15.

In accordance with the present invention, and in order to obtain the desired high temperature characteristics of the invention, the junctions 11 and 12 should be spaced from one another by 4.4 mils, plus or minus about 10%.

Figure 4:
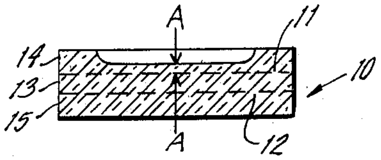
FIGURE 4 shows the wafer of FIGURE 3 after the formation of a well therein.
Figure 5:
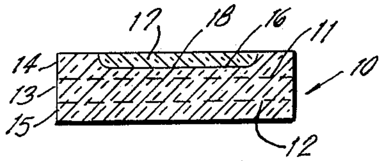
FIGURE 5 shows the wafer of FIGURE 4 after depositing an epitaxial layer in the well thereof.

A circular well 16 is then formed in the upper surface of wafer 10, as shown in FIGURE 4, which has a diameter of about 0.5 inch and a critical depth, in accordance with the invention, such that the bottom of well 16 is spaced from junction 11 by a distance A which is 2.2 mils plus or minus 10%. In the embodiment shown, layer 14 (and layer 15) has a thickness of 4.3 mils so that well 16 has a depth of 2.1 mils. Well 16 is formed by suitable masking and etching techniques well known to those skilled in the art and shown in above-noted U.S. Patent 3,278,347.

Thereafter, the circular well 16 is filled with N-type silicon 17 by epitaxial deposition of silicon from the vapor phase to create an extremely well defined junction 18 which terminates on the wafer surface. This process is identical to that described in above-noted Patent 3,278,347, except for the critical dimensions of 2.2 mils plus or minus 10% for the spacing of junctions 18 and 11 and 4.4 mils plus or minus 10% for the spacing of junctions 11 and 12.

Figure 6:
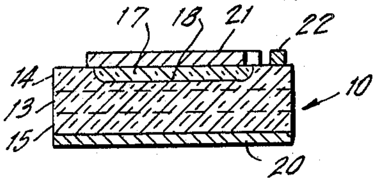
FIGURE 6 shows the wafer of FIGURE 5 after the formation of contacts thereon.
Figure 7:
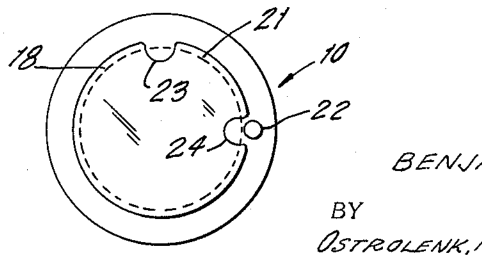
FIGURE 7 is a top plan view of the wafer of FIGURE 6.

The wafer is then provided with electrodes such as anode electrode 20, cathode electrode 21 and gate electrode 22 in any conventional manner, as shown in FIGURES 6 and 7 where the soldering of the electrodes to the wafers avoids the use of gold doping, and suitable leads are connected to these electrodes. Cathode electrode 21 is of the "shorted emitter" type and overlaps the junction 18. Notches 23 and 24 are formed through electrode 21 (which may be of aluminum formed over an initial nickel plate as in U.S. Patent 3,297,921 (IR-333) and one or more gate electrodes are located within these notches, such as gate electrode 22 located within notch 24.

A sample of 985 devices were made in the manner described above and were tested for various parameters at 175° C. The rating of these devices was 70 amperes forward D-C at 600 to 800 volts D-C reverse voltage.

The devices were first tested for forward voltage drop, it being considered that a forward voltage drop of less than 1.85 volts at rated forward current was a desired characteristic. 642 of the test devices (65.18%) had forward voltage drops less than 1.85 volts, and the remaining 343 devices had a forward drop greater than 1.85 volts.

Of the devices having forward voltage drops of less than 1.85 volts, the following turn-off times and resistance to firing by rate-of-rise-of-forward-voltage were determined:

| No of units | Turn-off time | dv/dt |
|---|---|---|
| 54(5.4%) | Between 20 and 30 microseconds. | Less than 100 volts/mse |
| 39(5.9%) | do | Between 100–200 v./ms. |
| 125(12.7%) | do | Greater than 200 v./ms. |
| 53(5.4%) | Less than 20 microseconds. | Less than 100 v./ms. |
| 45(4.5%) | do | Between 100–200 v./ms. |
| 326(33.1%) | do | Greater than 200 v./ms. |

In the above, acceptable devices were deemed to be those which would turn off in less than 20 ms. and had a *dv/dt* rating greater than 200 v./ms. (as well as the aforementioned forward voltage drop of less than 1.85 volts). From the above chart, 326 devices met these requirements. Of course, other of the devices could still be used in special applications where one of *dv/dt*, turn-off time, or forward voltage drop is unimportant.

In devices made which did not use the critical junction spacing of junctions 11 and 18 of 2.2 mils plus or minus 10% or the 4.4 mils plus or minus 10% spacing between junctions 11 and 12, the above characteristics could not be met at 175° C., the device characteristics degrading rapidly above 125° C.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A controlled rectifier operable at 175° C. comprising a monocrystalline wafer of silicon; first and second spaced parallel junctions extending across said wafer and spaced from one another by 4.4 mils plus or minus 10%; a well formed in the upper surface of said wafer having a bottom spaced from the uppermost of said spaced parallel junctions by 2.2 mils plus or minus 10%; a layer of epitaxially deposited silicon filling said well of a conductivity type opposite the conductivity type of the surface of said well, thereby to define a third junction; an anode electrode connected to the bottom surface of said wafer; a cathode electrode connected to the top of said material in said well, and a gate electrode connected to the top surface of said wafer external of said well.

2. The device of claim 1 which has a forward voltage drop less than 1.85 volts at 175° C.

3. The device as set forth in claim 1 which has a turn-off time of less than 20 microseconds at 175° C.

4. The device as set forth in claim 1 which has a forward voltage rise withstandability of more than 200 volts/microsecond at 175° C.

5. The device as set forth in claim 2 which has a forward voltage rise withstandability of more than 200 volts/microsecond and a turn-off time of less than 20 microseconds at 175° C.

6. The device as set forth in claim 1 wherein said cathode electrode extends across said upper surface of said wafer to regions external of said well.

7. The device as set forth in claim 5 wherein said cathode electrode extends across said upper surface of said wafer to regions external of said well.

References Cited

UNITED STATES PATENTS 3,278,347 10/1966 Topas ---------- 317—235 X

JOHN W. HUCKERT, Primary Examiner

R. F. POLISSACK, Assistant Examiner

U.S. Cl. X.R.

317—235